United States Patent
Mannlein

Patent Number: 5,603,399
Date of Patent: Feb. 18, 1997

[54] ADJUSTABLE BUCKET

[75] Inventor: Dean J. Mannlein, Joppa, Md.

[73] Assignee: Lever Brothers Company, Division of Conopco, Inc., New York, N.Y.

[21] Appl. No.: 445,841

[22] Filed: May 22, 1995

Related U.S. Application Data

[63] Continuation of Ser. No. 174,599, Dec. 28, 1993, abandoned.

[51] Int. Cl.⁶ .................................................. B65G 17/12
[52] U.S. Cl. .................................. 198/803.11; 198/803.14
[58] Field of Search ........................ 198/803.11, 803.14, 198/708, 710, 711, 712, 731

[56] References Cited

U.S. PATENT DOCUMENTS

| | | |
|---|---|---|
| 1,944,374 | 1/1934 | Schmidtke . |
| 2,358,292 | 9/1944 | Malhiot . |
| 2,595,182 | 4/1952 | Weingarten ..................... 198/803.14 X |
| 3,580,381 | 5/1971 | Kilner . |
| 3,608,701 | 9/1971 | Dieter . |
| 3,992,855 | 11/1976 | Palmieri et al. . |
| 4,159,762 | 7/1979 | Bulwith . |
| 4,264,292 | 4/1981 | Pisoni . |
| 4,718,540 | 1/1988 | Greenwell . |
| 4,787,505 | 11/1988 | Tweedy . |
| 4,874,067 | 10/1989 | Greenwell . |
| 4,968,240 | 11/1990 | Binacchi . |
| 5,096,043 | 3/1992 | Gorrieri et al. . |
| 5,127,514 | 7/1992 | Guttinger et al. . |
| 5,248,028 | 9/1993 | Weiblen et al. ................... 198/803.14 |

FOREIGN PATENT DOCUMENTS

| | | | |
|---|---|---|---|
| 2552735 | 4/1985 | France ............................. | 198/803.11 |
| 252041 | 9/1948 | Switzerland . | |

*Primary Examiner*—James R. Bidwell
*Attorney, Agent, or Firm*—Gerard J. McGowan, Jr.

[57] ABSTRACT

An adjustable conveyor bucket for soap or the like. The adjustable bucket includes a first bucket wall, a second bucket wall, a base, a pillar extending through the second bucket wall and the base, and adjusting pins extending from the second bucket wall and received within apertures in the base. The pillar is downwardly spring biased and the width of the container is adjusted by raising the second bucket wall and moving it in a direction transverse to the bucket wall so that the locator pins are received within a second set of apertures spaced transversely from the first set.

5 Claims, 2 Drawing Sheets

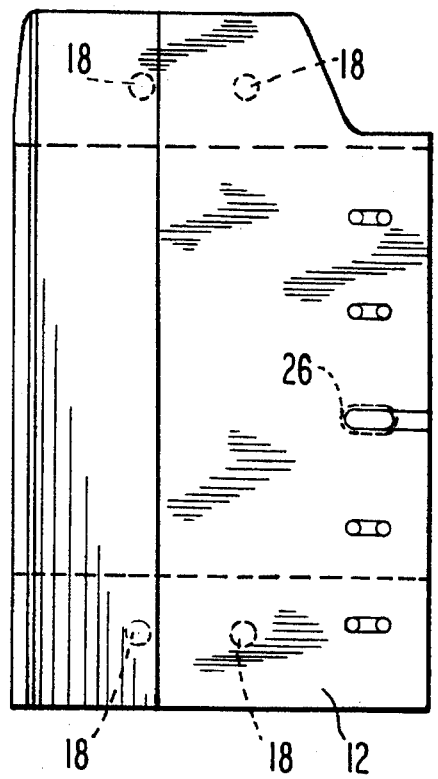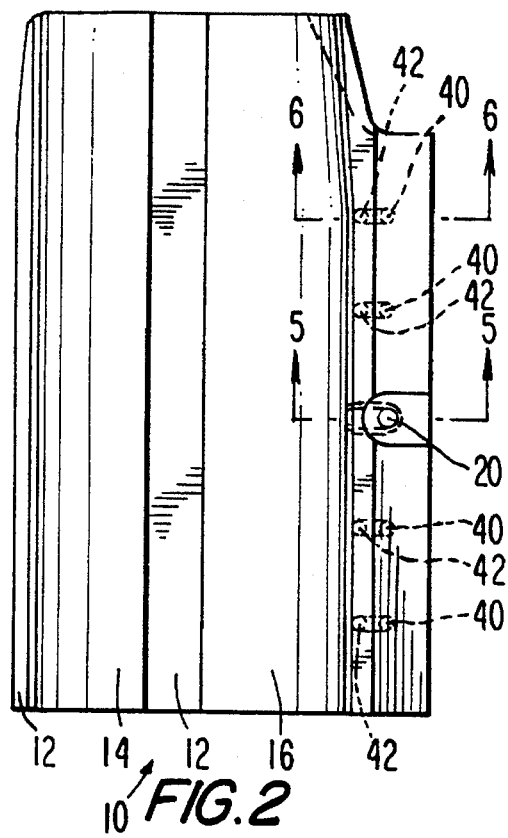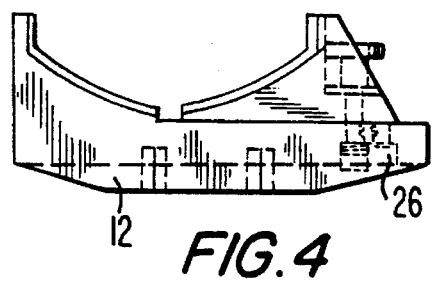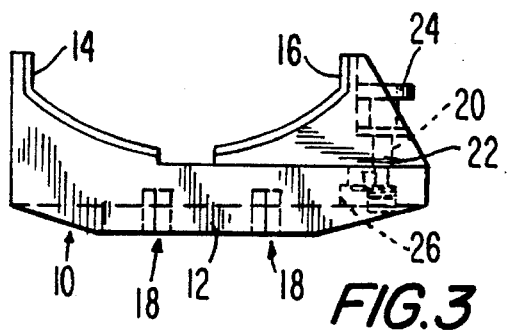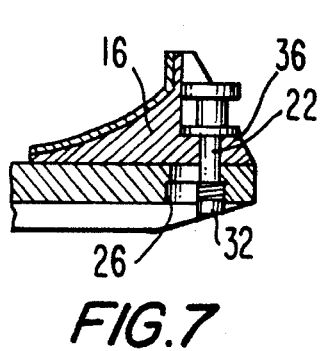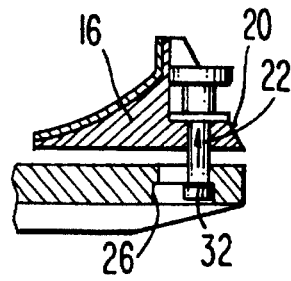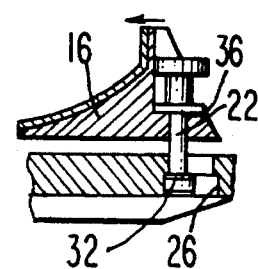

ADJUSTABLE BUCKET

This is a continuation application of Ser. No. 08/174,599, filed Dec. 28, 1993, abandoned.

BACKGROUND OF THE INVENTION

In the manufacture of soaps and other products, it is desirable that the process and equipment are adaptable to different sizes of product. For instance, it may be desirable to manufacture different sizes of soap bar on the same manufacturing line.

In general, soap bars are formed in a press, after which they are conveyed to a cartoner, in which they are packaged. In present practice, soap bars may be transported from the press to the cartoner using adjustable buckets. Thus soap bars of differing widths can be accommodated. However, current adjustable soap buckets include a screw which must be loosened to adjust the bucket. This can lead to errors and result in a slowdown in the line while the screw is unscrewed, the bucket is adjusted, and the screw is again screwed into place.

The Guttinger et al., U.S. Pat. No. 5,127,514, discloses a variable-width conveyor bucket. The Guttinger et al. conveyor bucket includes a serrated section on the upper face of a base member, a correspondingly serrated mating section provided on the underface of a second wall member and a spring-loaded locking means releasably retaining the serrated sections in interlocking engagement at a desired bucket width.

Dieter, U.S. Pat. No. 3,608,701, discloses a product bucket for an automatic cartoning machine having a channel-shaped element and a divider, the position of which may be adjusted with respect to the channel-shaped element.

Palmieri, U.S. Pat. No. 3,992,855, discloses an apparatus for transferring soap bars to be wrapped. Cradles for the soap bar are disclosed in, e.g., FIGS. 5 and 6. The sections or halves 103 of the cradles 3 can be brought into close proximity.

Pisoni et al., U.S. Pat. No. 4,264,292; Gorrieri, U.S. Pat. No. 5,096,043; and Binacchi, U.S. Pat. No. 4,968,240, disclose soap handling machines.

Greenwell, U.S. Pat. No. 4,874,067, discloses a cartoner having product bucket elements that are adjustable to accommodate different sizes of cartons. The disclosure is directed to automatic means for accomplishing the adjustment.

Greenwell, U.S. Pat. No. 4,718,540, is directed to a cartoner having product bucket elements that are adjustable to accommodate different sizes of cartons. Automatic means for accomplishing the adjustment are disclosed.

Bulwith, U.S. Pat. No. 4,159,762, is directed to an apparatus for transferring containers of different dimensions.

Kilner, U.S. Pat. No. 3,580,381, is directed to a method and apparatus for conveying drupe halves.

SUMMARY OF THE INVENTION

It has been discovered that a very quick, toolless adjustment of a soap bucket or other bucket with little or no error on setup dimensions can be accomplished using a spring-loaded adjustable bucket having locator pins which allow for stable positioning. The bucket comprises first and second generally parallel bucket walls and means permitting adjustment so that the space between the bucket walls can be varied. Thus, the bucket can accommodate soap bars or other products of varying widths.

The second bucket wall is releasably secured to a base by a spring-loaded hold-down shaft or pillar. Apertures are provided in the second bucket wall and in the base, which accommodate the hold-down pillar. The aperture of either the second bucket wall or the base is elongated in the direction generally perpendicular to the bucket wall so that the second bucket wall and the base can be moved relative to each other in the direction perpendicular to the bucket wall. This permits adjustment of the width of the bucket.

The second bucket wall is held in the desired position by one or more of the locator pins which extend from the second bucket wall or the base. The locator pin or pins are received within apertures which are provided in the second bucket wall or in the base, depending on which of these the pin projects from. That is, where the pin projects from the second bucket wall, the apertures receiving the pins will be in the base and when the pins project from the base, the apertures receiving same will be in the second bucket wall. Apertures dimensioned to receive the pins will be spaced so that at least two apertures are provided for each pin.

Preferably, the apertures for each pin fall within a line generally perpendicular to the longitudinal axis of the bucket wall. The pin and apertures serve to set stably the position of the second bucket wall so that the wall will not move except when it is desired to change the width of the bucket. The width of the bucket is changed by applying sufficient force to overcome the spring load and thereby lift the second bucket wall high enough so that the pin is withdrawn from the aperture and so that the second bucket wall can be moved, whereby the pin is received within a different aperture spaced from the first in a direction generally perpendicular to the second bucket wall.

In order to understand better the objects and features of this invention, the invention will be described with respect to one or more embodiments by way of example only, as illustrated in the accompanying drawings.

BRIEF DESCRIPTION OF THE DRAWINGS

FIG. 1 is a top plan view of a base of an adjustable soap bucket according to the invention FIG. 2 is a top plan view of an adjustable soap bucket according to the invention including both the base and a second bucket wall FIG. 3 is a front elevational view of an adjustable soap bucket according to the invention.

FIG. 4 is a front elevational view similar to FIG. 3, except that the width of the bucket has been adjusted in accordance with the invention

FIGS. 7–10 are similar to FIG. 5, except that the locator pin is present and is shown in varying positions during adjustment of the soap bucket.

DETAILED DESCRIPTION OF THE INVENTION

Figure 11:
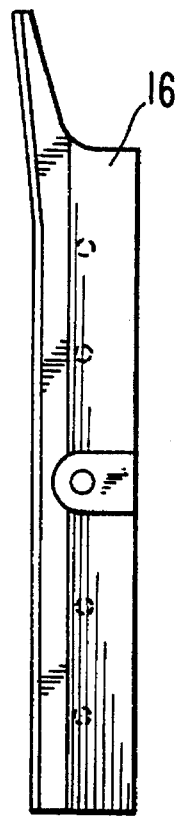
FIG. 11 is a top plan view of the second bucket wall.
Figure 12:
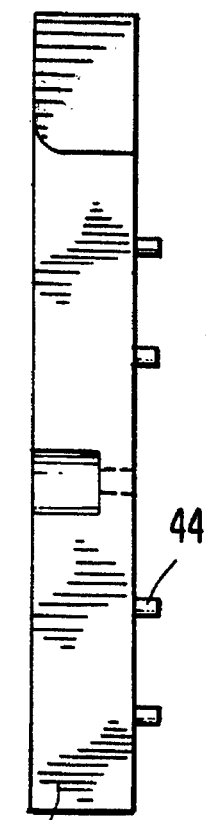
FIG. 12 is a side elevational view of the second bucket wall.

Adjustable soap bucket 10 (FIGS. 2–4) comprises a base 12, which includes a first bucket wall 14. Resting atop base 12 is second bucket wall 16. Base 12 may be attached to an underlying conveyor, not shown, utilizing shafts 18. The first and second bucket walls each include upright portions and portions which would underlie any soap bar contained in the bucket.

The spacing of second bucket wall 16 from first bucket wall 14 is adjustable in a direction transverse to said second wall. To this end, second bucket wall 16 is provided with aperture 20 for accommodating locating pillar 22. Pillar 22 may be provided with planar top 24 for ease of handling. Base 12 is likewise provided with aperture 26 for accommodating pillar 22, although it will be noted that aperture 26 is elongated as compared to aperture 20, in the direction transverse to the longitudinal axis of second bucket wall 16.

At the bottom of pillar 20 is a section 30 having a larger diameter, above which is disposed spring 32 surrounding the pillar. The length and width of aperture 26 at 64 above spring 32 is less than that of portion 30 of pillar 20 so that the spring is positioned between the annular upper surface of the enlarged diameter 30 and the annular ceiling formed by the bottom of restricted portion 64. Above the portion of pillar 22 accommodated within aperture 20 is flange 36 extending transverse to the axis of the pillar. Spring 32 biases pillar 20 downwardly so that flange 36 applies pressure to second bucket wall 16 which normally prevents it from moving upwardly.

Base 12 includes four pairs of apertures 40, 42. Second bucket wall 16 includes locator pins 44 projecting downwardly from the lower surface thereof. Apertures 40 and 42 are dimensioned to be slightly larger than the pins 44 so that they can be received within the apertures. Locator pins 44 are positioned so that they can be received within either aperture 40 or 42, depending on the desired width of the bucket.

Figure 6:
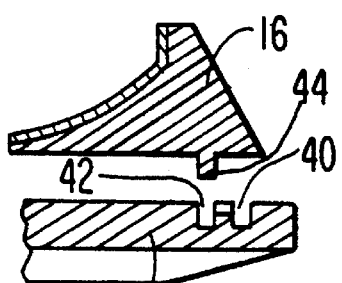
FIG. 6 is a cross-section along the lines 6—6 of FIG. 2
Figure 5:
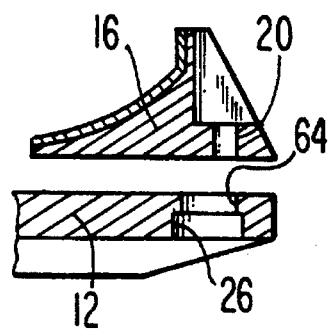
FIG. 5 is a cross-section along the lines 5—5 of FIG. 2, except that the locator pin has been removed.
Figure 10:
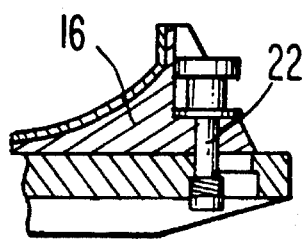

Assuming that the bucket initially includes locator pins 44 disposed within apertures 40, the adjustment of the bucket may be effected as follows. Pillar 22, shown initially in FIG. 7, is lifted upwardly together with second bucket wall 16, as shown in FIG. 8. This operation will compress spring 32. As seen in FIG. 9, second bucket wall 16 and pillar 22 are moved in a direction perpendicular to wall 16. As a result, locator pin 44 is positioned over aperture 42 (FIG. 6). Then, wall 16 and pillar 22 are released so that pin 44 is permitted to rest within aperture 42 and the width of the bucket is changed. The initial width is shown in FIG. 3, whereas a narrower width accomplished by the operation just described is shown in FIG. 4.

The elongation of aperture 26 is generally at least as long as the distance from pin aperture 40 to pin aperture 42 since the elongation accommodates the movement of the second bucket wall from the first position to the second. If more than two pin apertures are used, the elongation accommodates the distance along an axis perpendicular to the longitudinal axis of the second bucket wall between the most distant pin apertures.

The elongation of aperture 26 and hence the distance by which the width of the soap bucket may be varied is preferably at least ⅜ inch, which is the preferred minimum distance between pin apertures. The elongation is preferably varied in ⅜-inch multiples. A typical adjustment for the width of the bucket width may range from 2 inches to 2-¾ inches.

Adjustment of the width of the bucket as just described requires no tools and can be manually carried out in a very short period of time. All that is required is application of the upward pressure to clear pin 44 from the aperture in which it is received so that it can be moved to another aperture spaced therefrom in a direction perpendicular to the length of the second bucket wall. It has been found that the time required to change the complete machine has been reduced by over 15 minutes from the previous arrangement, wherein it was necessary to unscrew a screw to adjust the bucket.

The apparatus has been disclosed with respect to a four-inch pitch cartoning machine for soap bars, but may be used in other embodiments. The locator pins are preferably made of stainless steel. The soap bucket is preferably made of a durable plastic or may be made of steel or other suitable materials.

A Jones cartoner may be usefully employed.

While the present soap bucket has been described with respect to its length and width, it will be appreciated that the principles of the invention may be practiced with buckets of different dimensions.

It will be appreciated that changes in the above embodiments may be made without departing from the spirit of the present invention. Therefore, reference should be had to the following claims in ascertaining the scope of the invention.

What is claimed is:

1. An adjustable bucket suitable for containing a soap bar comprising:
   a. a first bucket wall having a first upright portion and a first portion positioned partially to underlie a soap bar contained in said bucket,
   b. a second bucket wall having a second upright portion and a second portion positioned partially to underlie said soap bar in a first position such that said second upright portion extends generally parallel to said first bucket wall upright portion, said second bucket wall being supported by a base and moveable to one or more further positions wherein said second upright portion is generally parallel to said first bucket wall upright portion but spaced from said first position,
   c. said base comprising an aperture,
   d. said second bucket wall comprising an aperture,
   e. means yieldingly urging said second bucket wall against said base,
   f. one of said base or second bucket wall apertures being elongated relative to the other of said base or second bucket wall apertures in a direction perpendicular to said second bucket wall,
   g. a pin extending from one of said base or said second bucket wall,
   h. at least two pin-receiving apertures in the other of said base or second bucket wall,
   i. one of said pin-receiving apertures being dimensioned to receive said pin at a first position and the other of said pin-receiving apertures dimensioned to receive said pin at a position spaced from said first pin-receiving aperture in a direction generally perpendicular to the second bucket wall.

2. The adjustable bucket of claim 1, wherein said pins are integral with said second bucket wall.

3. The adjustable bucket of claim 1, wherein said first bucket wall and said second bucket wall base are integral with each other.

4. The adjustable bucket of claim 1 wherein said yieldingly urging means comprises a pillar associated with a spring.

5. The bucket according to claim 1 further wherein said bucket contains a soap bar.

* * * * *